United States Patent [19]

Sakamoto et al.

[11] Patent Number: 4,831,477
[45] Date of Patent: May 16, 1989

[54] LOADING MECHANISM FOR A MAGNETIC DISK DEVICE

[75] Inventors: Yuzo Sakamoto, Kohriyama; Hisashi Koga, Yokohama; Shoichi Saito, Kamakura, all of Japan

[73] Assignee: Mitsubishi Denki Kabushiki Kaisha, Tokyo, Japan

[21] Appl. No.: 113,434

[22] Filed: Oct. 28, 1987

Related U.S. Application Data

[63] Continuation of Ser. No. 721,355, Apr. 9, 1985, abandoned.

[30] Foreign Application Priority Data

Apr. 9, 1984 [JP] Japan ................... 59-70694

[51] Int. Cl.⁴ ........................................... G11B 17/022
[52] U.S. Cl. .................... 360/99.06; 360/99.02
[58] Field of Search ........................... 360/97–99, 360/105, 96.5; 369/77.1, 77.2, 75.1, 75.2, 270, 271

[56] References Cited

U.S. PATENT DOCUMENTS

| 4,159,495 | 6/1979 | Tsutsumi | 360/96.5 |
| 4,546,396 | 10/1985 | Schatteman | 360/97 |
| 4,562,498 | 12/1985 | Shibata | 360/99 |
| 4,564,875 | 1/1986 | Ihara | 360/96.5 |
| 4,604,666 | 8/1986 | Kitahara et al. | 360/105 |

FOREIGN PATENT DOCUMENTS

| 56-54668 | 5/1981 | Japan | 360/105 |
| 59-65977 | 4/1984 | Japan | 360/105 |
| 59-124070 | 7/1984 | Japan | 360/105 |
| 1084883 | 4/1984 | U.S.S.R. | 360/105 |

Primary Examiner—John H. Wolff
Assistant Examiner—Matthew J. Bussar
Attorney, Agent, or Firm—Armstrong, Nikaido, Marmelstein & Kubovcik

[57] ABSTRACT

An improved loading mechanism for a magnetic disk device comprises a rack provided on a movable plate, and a rotary oil damper provided on a fixed or stationary member and having a gear wheel provided thereon, whereby the rack is engaged with the gear wheel so as to control a speed of slipping movement of the movable plate causes by a force of a return spring. Accordingly, a force of a second magnetic head to collide with a first magnetic head is reduced, and hence damage to a flexible disk or break of a magnetic head can be minimized while the reliability of the system is improved.

2 Claims, 4 Drawing Sheets

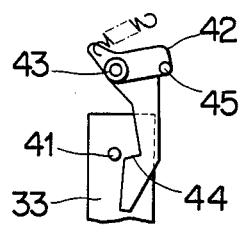
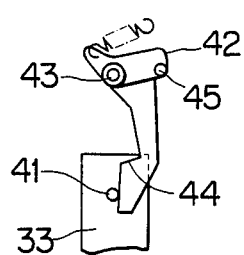
FIG. 6a  FIG. 6b
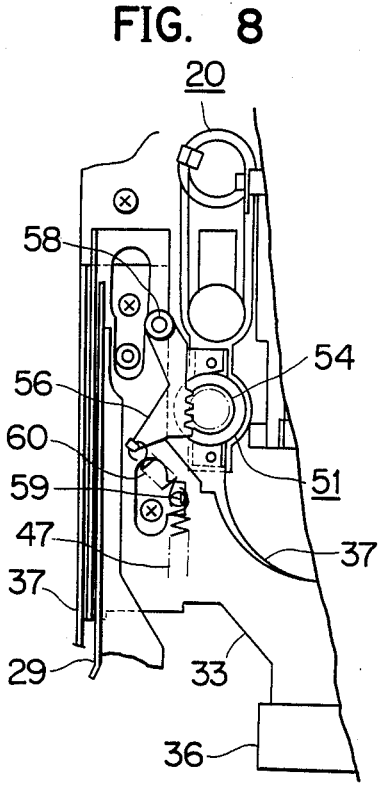
FIG. 8
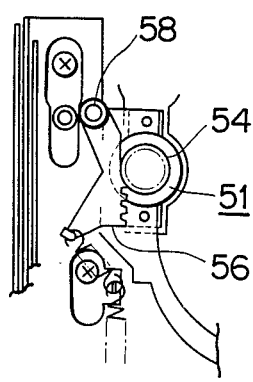
FIG. 9
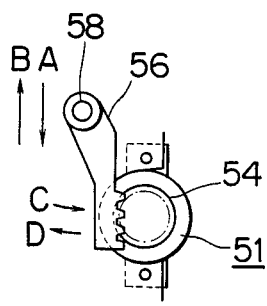
FIG. 10

LOADING MECHANISM FOR A MAGNETIC DISK DEVICE

This application is a continuation of application Ser. No. 721,355 filed Apr. 9, 1985, now abandoned.

BACKGROUND OF THE INVENTION

This invention relates to a cassette loading mechanism for a magnetic disk device using a disk cassette to effect magnetic recording in which mechanism a disk cassette is moved up and down between a temporary loaded position and a final loaded position.

A typical one of cassette loading devices for conventional magnetic disk devices of the type described above is illustrated in FIGS. 1 to 3.

Referring to FIGS. 1 to 3, reference numeral 1 denotes a disk cassette in which a flexible disk 2 is accommodated as seen in detail in FIG. 4, 10 a magnetic disk device onto which the disk cassette 1 is to be inserted or loaded, 11 a chassis of the disk device 10, 12 a drive motor secured to a bottom face of the chassis 11 and having a driving portion exposed to a top face of the chassis 11, 13 a spindle hub provided on the driving portion of the drive motor 12, 14 a positioning pin provided on the spindle hub 13 for engagement with a hole 3 of the disk cassette 1 shown in FIG. 4, 15 a driving pin also provided on the spindle hub 13 for engagement with another hole 4 of the disk cassette 1 shown in FIG. 4, 16 a panel provided on a front face of the chassis 11, 17 an opening formed in the panel 16 for allowing a disk cassette to be loaded onto and unloaded from the magnetic disk device, 18 a guide rod provided on the top face of the chassis 11, 19 a carriage supported on the guide rods 18 and connected to be driven by a driving means to be mentioned below, and 20 a positioning driving means for the carriage 19. The positioning driving means 20 includes, as shown in FIG. 3, a drive pulley 21 on a positioning motor (not shown) secured to the bottom face of the chassis 11, an idler pulley 22, and a belt 23 extending between the drive and idler pulleys 21 and 22 and coupled to the carriage 19.

Reference numeral 24 denotes a first magnetic head mounted on the carriage 19, 25 an arm mounted for pivotal motion of the carriage 19 by means of a fulcrum pin 26, 27 a second magnetic head mounted on the arm 25, and 28 a lifting portion extending from an intermediate portion of the arm 25 for lifting the arm 25. The function of the lifting portion 28 will be hereinafter described.

Reference numeral 29 denotes a disk cassette holder for guiding a disk cassette 1 to be loaded and for holding it thereon, and when a cassette is not loaded, the disk cassette holder 29 is positioned in opposing relationship to the opening 17 of the panel 16, and when a cassette is to be loaded, the disk cassette holder 29 is moved down to position the disk cassette 1 to a position as shown in phantom in FIG. 5. The disk cassette holder 29 is supported on a movable plate 33 having a structure as hereinafter described. Reference numeral 30 denotes a bent lug formed on either of opposite side edges of the disk cassette holder 29, 31 a pin secured to each of the bent lugs 30, 32 a roller mounted for rotation on each of the pins 31, and 33 a movable plate provided on the chassis 11 for movement in a direction of an arrow mark in FIG. 3. The movable plate 33 has a pair of bent portions 34 located outwardly of opposite sides of the disk cassette holder 29, and an inclined groove 35 is formed on a portion of each of the bent portions 34 of the movable plate 33 corresponding to one of the rollers 32 so that the roller 32 may engage with the inclined groove 35. Thus, the holder 29 is supported by engagement of the rollers 32 with the inclined grooves 35. Reference numeral 36 designates an operation button provided on the movable edges of the top face of the chassis 11 and located outwardly of the bent portion 34 of the movable plate 33. Each of the brackets 37 has a guide groove 38 formed therein which is engaged with one of the pins 31 so as to allow the roller 32 engaged with the inclined groove 35 of the bent portion 34 of the movable plate 33 to effect only up and down movement as the movable plate 33 moves. With this construction, when the movable plate 33 moves in a direction of arrow A toward the bottom of FIG. 3, the holder 29 is lowered to approach the chassis 11 by the inclined grooves 35, and on the contrary when the movable plate 33 moves in the opposite direction of arrow A toward the top of FIG. 3, the holder 29 is lifted.

Reference numeral 39 denotes a lever portion provided at a rear part of the disk cassette holder 29 for transmitting a motion of the holder 29 to the lifting portion 28 of the arm 25 to control pivotal motion of the arm 25, 40 a stopper portion formed at another rear part of the disk cassette holder 29 for abutting engagement with a disk cassette 1 loaded in the magnetic disk device, 41 a lock pin provided at part of the movable plate 33, and 42 a lock level mounted for pivotal motion on the chassis 11 by means of a pin 43. The lock lever 42 has an engaging shoulder 44 formed to engage with the lock pin 41, and a cassette detecting pin 45 located to be pushed by a disk cassette 1 slightly before the disk cassette 1 is abutted with the stopper portion 40, and is acted upon by a force to pivot the same in a clockwise direction in FIG. 3 by means of a spring 46. Reference numeral 47 designates a return spring for returning the movable plate 33 in a direction of arrow mark toward the bottom of FIG. 3 to an initial position. When a disk cassette 1 is not loaded in the magnetic disk device, the lock pin 41 is in engagement with the engaging shoulder 44 of the lock lever 42 so that the movable plate 33 is prevented from being moved or returned in the direction of arrow mark toward the bottom of FIG. 3 by a force of the return spring 47.

Reference numeral 48 in FIG. 2 designates a holding spring secured to the holder 29 for holding a disk cassette 1 downwardly toward the chassis 11, and reference numerals 49 and 50 in FIG. 3 denote each a positioning pin for receiving thereon a disk cassette 1 which has been lowered together with the holder 29.

Operations of the magnetic disk device will be described now.

The disk device having such a construction as described above has a basic structure which, after a disk cassette 1 as shown in FIG. 4 has been inserted in a direction Y from an insertion position indicated by H1 in FIG. 5, lowers the disk cassette 1 and positions it to a position H2.

A disk cassette 1 is inserted through the opening of the panel 16 into the disk cassette holder 29 until it is abutted with the stopper portion 40 provided on the disk cassette holder 29. A little before the disk cassette 1 is abutted with the stopper portion 40, the detecting pin 45 of the lock lever 42 which is in engagement with the lock pin 41 on the movable plate 33 is pushed by the disk cassette 1 to pivot the lever 42 to disengage the engaging shoulder 44 thereof from the lock pin 41

(FIGS. 6(a) and 6(b)) so that the movable plate 33 is allowed to be slipped by a force of the return spring 47 in a direction toward the panel 16 to a position as indicated by a position of the button 36 which is shown by a broken line in FIG. 1.

By this slipping movement of the movable plate 33, the disk cassette holder 29 is lowered with the disk cassette 1 carried thereon due to engagement of the inclined grooves 35 of the bent portions 34 of the movable plate 33 with the rollers 32 on the cassette holder 29. As the disk cassette holder 29 is lowered in this way, positioning holes 5 and 6 (FIG. 4) provided in the disk cassette 1 are fitted around projection 49a (FIG. 5) of the positioning pins 49 to thereby position the disk cassette 1 in X—X and Y—Y directions. Meanwhile, the disk cassette 1 is positioned in the Z direction to a plane defined by the positioning pins 49 and 50. Thus, the flexible disk 2 is positioned and rotated by the positioning pin 14 and the drive pin 15 on the spindle hub 13 which pins are fitted in the holes 3 and 4, respectively, formed at a central part of the flexible disk 2.

As the cassette holder 29 is lowered, the arm 25 is pivoted in a counterclockwise direction in FIG. 1 about the fulcrum pin 26 by an arm pressing spring (not shown) until the second magnetic head 27 which has been spaced from the first magnetic head 24 due to engagement of the lifting portion 28 of the arm 25 with the lever portion 39 of the disk cassette holder 29 is lowered into contact with the first magnetic head 24 via the flexible disk 2. It is to be noted that the lever portion and the lifting portion are spaced from each other in a completely lowered position of the disk cassette holder 29. This intends to stabilize recording/reproducing operations of the magnetic disk device by providing a slight gap between the lever portion 39 and the lifting portion 28 upon recording/reproducing operation.

When the disk cassette 1 is to be unloaded from the magnetic disk device, the button 36 which is projected to the broken line position in FIG. 1 will be pushed in the disk cassette inserting direction. As the button 36 is thus pushed in, the movable plate 33 coupled to the button 36 is also pushed against the returning spring 47 to slip to a predetermined position at which the lock pin 41 on the movable plate 33 is engaged again with the lock lever 42. Consequently, the movable lever 33 is held to the predetermined position by the lock lever 42. Meanwhile, the disk cassette holder 29 is lifted by the rollers 32 engaged by the inclined grooves 35 of the movable plate until the initial position in which a disk cassette 1 can be loaded or inserted into the device is reached to allow the disk cassette 1 to be discharged by means of an ejector not shown. In the meantime, as the holder 29 is lifted, the arm 25 is pivoted by the lever portion 39 engaged with the lifting portion 28 so that the second magnetic head 27 is moved out of contact with the first magnetic head 24 to a position in which the disk cassette 1 is prevented from interfering with the second magnetic head 27 when it is discharged from the device.

As described above, in the cassette loading mechanism for lifting and lowering a disk cassette between a temporary loaded position and a final loaded position, loading or inserting operation of a disk cassette 1 will cause, simultaneously with such insertion, collision of the first and second magnetic heads 24 and 27 with each other via a flexible disk 2 before they are brought into normal contact with each other via the flexible disk 2. A colliding force in this case originates in a force of the return spring 47 for the movable plate 33, and hence such collision occurs when a slipping speed of the movable plate 33 is at its maximum, or in other words, when a colliding force of the second magnetic head is at its maximum. As a result, a record face of the flexible disk 2 is sometimes damaged to disable recording to and/or reproduction from the same, or else the first and/or second magnetic heads are sometimes broken. The cassette loading mechanism has another drawback that if a force of the return spring 47 for the movable plate 33 is reduced to reduce the colliding force, operation itself of the movable plate becomes unstable.

SUMMARY OF THE INVENTION

The present invention has been made to eliminate such drawbacks of the conventional cassette loading mechanism as described above, and it is an object of the invention to provide a loading mechanism which can prevent appearance of damages to a surface of a flexible disk and a break of a first or second magnetic head by controlling a slipping speed of a movable plate to reduce a colliding force of the first and second magnetic heads.

In order to control a slipping speed of a movable plate, a loading mechanism according to the present invention comprises a rotary damper having a gear wheel provided thereon, and a rack mounted for engagement with the gear wheel of the rotary damper, one of the rotary damper and the rack being mounted on a movable plate while the other is mounted on a fixed member on which the movable plate is supported.

BRIEF DESCRIPTION OF THE DRAWINGS

FIGS. 6a and 6b are diagrammatic representations illustrating unlocking operation of amovable plate;

FIG. 8 is a view illustrating a modified form of loading mechanism of the invention;

FIG. 9 is a view illustrating a movable plate of the loading mechanism of FIG. 8 after operation; and FIG. 10 is a view illustrating a motion of a rack of the loading mechanism of FIG. 9.

DETAILED DESCRIPTION OF THE PREFERRED EMBODIMENT

Figure 1:
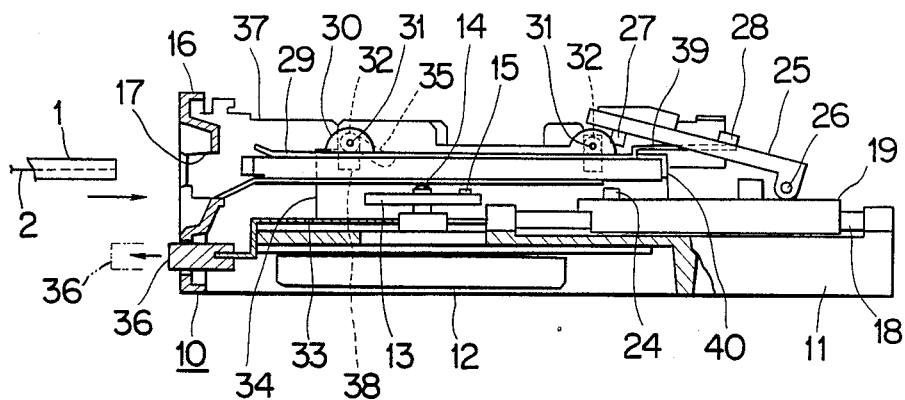
FIG. 1 is a side elevational sectional view of a typical one of conventional magnetic disk devices.
Figure 2:
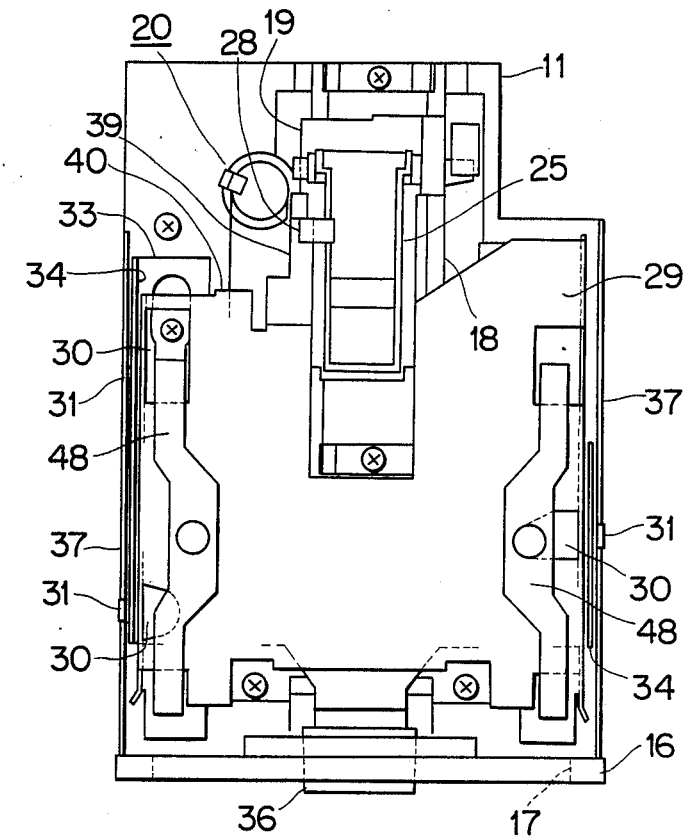
FIG. 2 is a top plan view of the device of FIG. 1.
Figure 3:
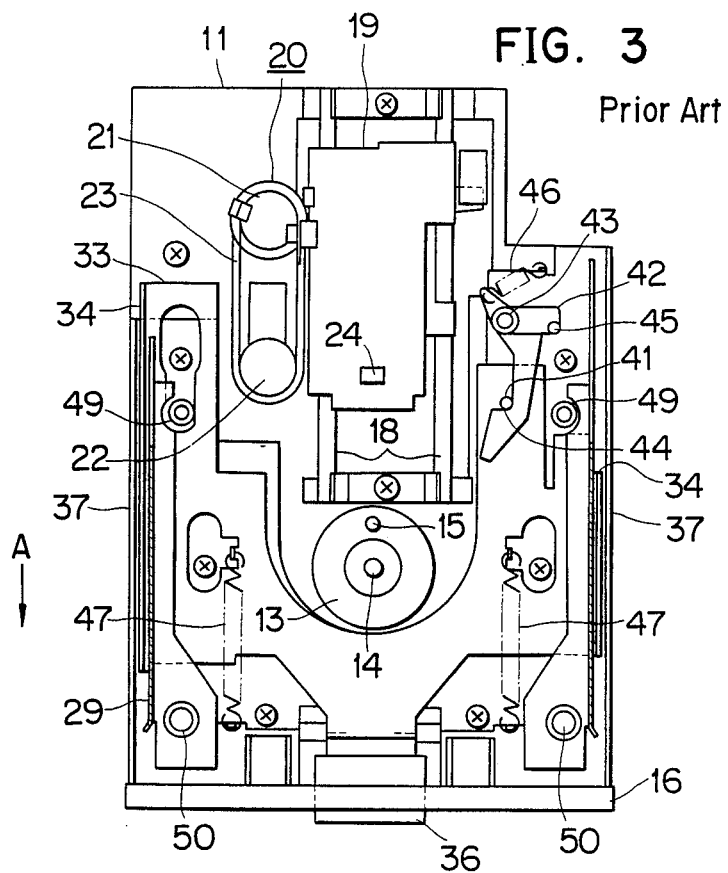
FIG. 3 is a view with a disk cassette holder of FIG. 2 partially omitted so as to facilitate illustration of a loading mechanism of FIG. 1.
Figure 4:
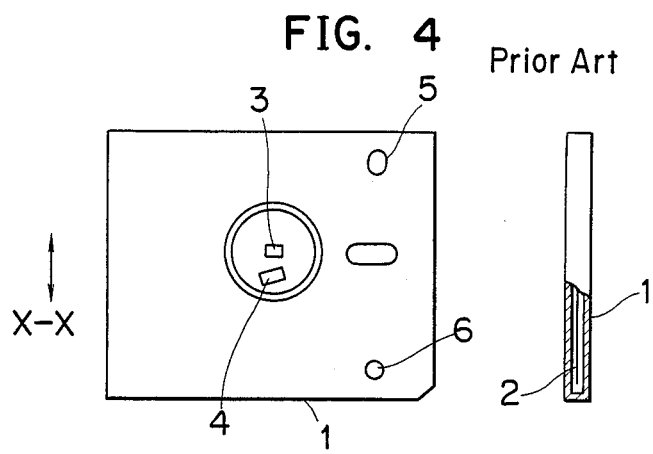
FIG. 4 is a view illustrating a configuration of a disk cassette.
Figure 5:
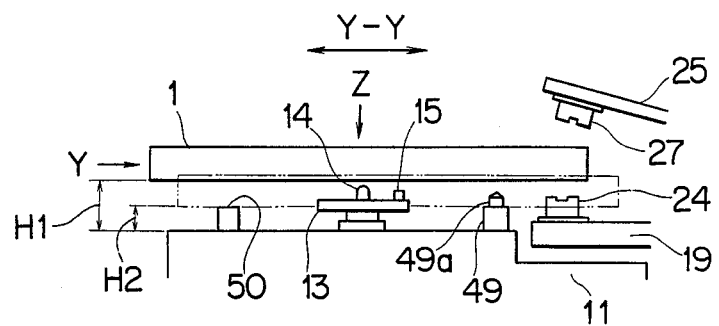
FIG. 5 is a view illustrating operation of a disk cassette when loaded into the device.
Figure 7:
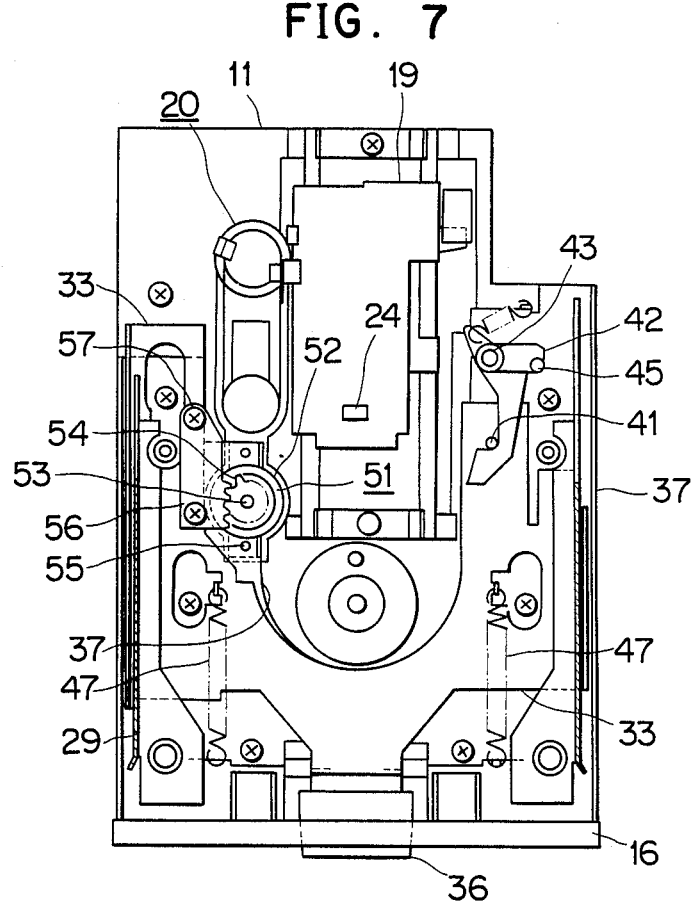
FIG. 7 is a view similar to FIG. 3, but illustrating an embodiment of loading mechanism of the present invention.

A preferred embodiment of the present invention will now be described with reference to the accompanying drawings. Referring first to FIG. 7, reference numeral 51 denotes an oil damper enclosed between a rotary portion and a casing 52 thereof, 53 a rotor pin of the rotary portion of the oil damper 51, 54 a gear wheel coupled to the rotor pin 53, 55 a fastening pin for securing the casing 52 of the oil damper 51 to a bracket 37, 56 a rack engaged with the gear wheel 54, and 57 a fastening screw for securing the rack 56 to a movable plate 33. Other components or parts are substantially similar to corresponding ones of the device as shown in FIGS. 1 to 3, and thus description of them will be omitted herein to eliminate redundancy.

In the loading mechanism having such a construction as described above, if a disk cassette 1 is inserted through an opening of a panel 16 into the magnetic disk device until it is abutted with a stopper portion 40 of a disk cassette holder 29, a lock lever 42 which has been in engagement with the lock pin 41 is disengaged therefrom by the disk cassette 1 so that the movable plate 33 is allowed to be slipped by a force of a return spring 47 in a similar manner to that of the conventional device. When the movable plate 33 is slipped, the rack 56 secured to the movable plate 33 is also moved in integral relationship therewith. Since the rack 56 is in engagement with the gear wheel 54, the gear wheel 54 is rotated as the rack 56 moves while it rotates the rotor pin 53 of the oil damper 51 which is integral with the gear wheel 54. Meanwhile, since the case 52 of the oil damper 51 is positively secured to the bracket 37, a slipping speed of the movable plate 33 is determined by a force exerted by the return spring 47 and by a viscous resistance between a rotor (not shown) integral with the rotor pin 53 within the oil damper and oil enclosed within the oil damper. A similar function is exhibited also when a disk cassette 1 is reversely discharged from the magnetic disk device in response to operation of a button 36.

While the conventional device described above has a drawback that a slipping speed of the movable plate 33 is high and hence a lowering speed of the disk cassette holder 29 and the arm 25 which are lowered in response to movement of the movable plate 33 is also high, resulting in a large colliding force when the second magnetic head 27 is brought into collision with the first magnetic head 24, if the viscosity of oil in the oil damper 51 is suitably selected, the slipping speed of the movable plate 33 can be freely determined and consequently the lowering speed of the second magnetic head 27 can be set to an optimum level. Consequently, the colliding force when the magnetic heads are brought into collision with each other via a flexible disk 2 can be moderated thereby to present an appearance of a trouble such as a damage to a flexible disk 2 or a break or the like of the magnetic head or heads.

Further, since the loading mechanism of the present invention has a structure which makes use of a viscous resistance of oil to control the speed of the movable plate 33, there is no need of reducing the force of the return spring 47 to reduce the slipping speed of the movable plate 33, and as a result the movable plate 33 can operate positively. Besides, holding of the position of the movable plate 33 after its operation can be stabilized by the force of the return spring 47 since the resistance of the oil damper does not make a load to the return spring 47.

A further advantage of the invention is that with the construction as described above, a colliding noise when an end portion of the groove 35 of the movable plate 33 is brought into collision with and controlled by the roller 32 after the movable plate 33 has been slipped can be moderated and noises produced upon operation can also be controlled.

It is to be noted that although in the embodiment described above the oil damper 51 is secured to a fixed or stationary section or member while the rack 56 engaged with the gear wheel 54 provided on the oil damper 51 is secured to the movable plate 33, the oil damper 51 and the rack 56 may otherwise be mounted reversely on the movable plate 33 and the stationary portion, respectively.

It is also to be noted that while the embodiment employs a rotary oil damper, alternatively a rotary air damper may present similar effects to those of the embodiment described above.

In addition, if the embodiment described above is modified to have a structure as illustrated in FIG. 8, operability of the loading mechanism is improved in addition to the effects of the embodiment. Such a modification will be described with reference to FIGS. 8 to 10.

While an oil damper 51 is secured to a bracket 37 as in the embodiment described above, a rack 56 engaged with a gear wheel 54 has a shaft hole formed at one end thereof so as to be pivoted about a rack fulcrum pin 58 provided on a movable plate 33. The other end of the rack 56 is not secured and is engaged by a coil spring 60 connected to a spring holder portion 59 provided on the movable plate 33. Meanwhile, the rack fulcrum pin 58 is positioned such that a moment produced at the rack 56 may act in a direction C when the movable plate 33 and the rack 56 are slipped in a direction A indicated in FIG. 10, that is, in a direction to lower a second magnetic head 27. When the movable plate 33 and the rack 56 are moved reversely in a direction B, that is, when a button 36 is pushed to discharge a disk cassette 1 from the magnetic disk device, the rack 56 is moved in a direction D so that it is disengaged from the gear wheel 54. Reengagement of the rack 56 with the gear wheel is effected by a moment acting in the direction C and by a coil spring 60. With the additional construction described just above, the modified loading mechanisms presents similar effects such as reduction of a colliding force of the second magnetic head 27 to those presented by the embodiment described hereinabove, and besides, since the rack 56 is disengaged from the gear wheel 54 when the button 36 is operated by an operator, a load by a viscous resistance of the oil damper is eliminated thereby to improve the operability of the magnetic disk device.

As apparent from the foregoing description, according to the present invention, a loading mechanism comprises a rack provided on a movable plate, and a rotary oil damper provided on a fixed or stationary member and having a gear wheel provided thereon, whereby the rack is engaged with the gear wheel so as to control a speed of slipping movement of the movable plate caused by a force of a return spring. Accordingly, the loading mechanism of the invention presents an effect that a colliding force of a second magnetic head with a first magnetic head can be reduced, appearance of damage to a flexible disk or a break of a magnetic head can be prevented and the reliability of the system can be improved.

What is claimed is:

1. In a loading mechanism for a magnetic disk device of the type which includes
a disk cassette holder for movably holding said disk cassette therein;
a movable plate for moving said cassette holder, said movable plate being adapted to be reciprocated between a first position for playing back said disk cassette and a second position for ejecting said disk cassette;
the improvement comprising a rotary damping having a gear wheel mounted on a rotor pin thereof, said gear wheel being adapted to rotate about a rotating axis of said pine;

a rack in mesh with said gear wheel;

one of said rotary damper and said rack being mounted on a fixed member within the disk device while the other is mounted on said movable plate, and said gear wheel being driven by said rack through relative movement to each other when said movable plate is reciprocated;

said rotary damper being a rotary oil damper.

2. In a loading mechanisms for a magnetic disk device of the type which includes a disk cassette holder for movably holding said disk cassette therein;

a movable plate for moving said cassette holder, said movable plate being adapted to be reciprocated between a first position for playing back said disk cassette and a second position for ejecting said disk cassette;

the improvement comprising a rotary damper having a gear wheel mounted on a rotor pin thereof, said gear wheel being adapted to rotate about a rotating axis of said pin;

a rack in mesh with said gear wheel;

one of said rotary damper and said rack being mounted on a fixed member within the disk device while the other is mounted on said movable plate, and said gear wheel being driven by said rack through relative movement to each other when said movable plate is reciprocated;

said rack being supported to extend slightly at an angle with respect to the direction of movement of said movable plate such that said rack is in mesh with said gear wheel when said movable plate is moved toward said first position, and said rack and said gear wheel go out of mesh with each other when said movable plate is moved toward said second position.

* * * * *